C. LANG.
Whip-Sockets.
No. 142,346.    Patented September 2, 1873.
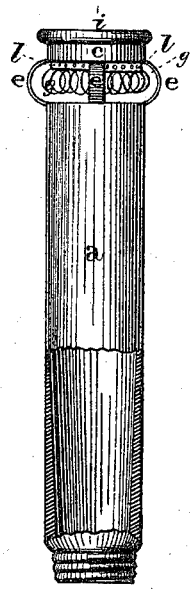
WITNESSES.    INVENTOR.

UNITED STATES PATENT OFFICE.

CORNELIUS LANG, OF YPSILANTI, MICHIGAN, ASSIGNOR OF ONE-HALF HIS RIGHT TO ALBERT H. NIMOCKS, OF SAME PLACE.

IMPROVEMENT IN WHIP-SOCKETS.

Specification forming part of Letters Patent No. 142,346, dated September 2, 1873; application filed April 14, 1873.

*To all whom it may concern:*

Be it known that I, C. LANG, of Ypsilanti, county of Washtenaw and State of Michigan, have invented certain new and useful Improvements in Whip-Sockets, of which the following is a specification:

The nature of my invention consists in an improvement in whip-sockets; and it consists in having a coiled spring arranged around the upper part of the socket, so as to prevent the whip from being accidentally displaced; it also consists in the arrangement and combination of parts which will be more fully described hereafter.

The accompanying drawing, partly in section, represents my invention.

$a$ represents the socket, made of any suitable material, having a screw-thread formed upon its lower edge, so as to secure it to any suitable base, and which is made thicker at its lower end, so as to cause the interior to taper toward the bottom, so as to suit different-sized whips. The top part $c$ is secured to the body by the straps $e$, or other devices, leaving a space between the two sufficient to allow full play to the coiled spring $g$ placed between them. Secured to the rim $i$ inside of the top is a perforated plate, $l$, which extends down a little below the edge of the top, and which has the spring $g$ coiled in and out around its entire edge. This spring extends into the socket, and serves to grasp and hold the whip when thrust in it with sufficient force to prevent its being accidentally jolted out or displaced.

Having thus described my invention, what I claim as new, and desire to secure by Letters Patent, is—

1. In a whip-socket, the coiled spring arranged around the socket, substantially as described.

2. In a whip-socket, the combination of the top $c$, perforated plate $l$, and spring $g$, substantially as shown.

3. In a whip-socket, the tapering socket-top, perforated plate, and coiled spring, when the various parts are arranged as set forth.

In testimony that I claim the foregoing as my invention I hereunto affix my signature this 8th day of April, 1873.

CORNELIUS LANG.

Witnesses:
 ANDREW J. CLARK,
 OTHNIEL G. LA RUE.